J. HOPKINSON.
PENDULUM SCALE.
APPLICATION FILED JUNE 12, 1916.
1,316,576.
Patented Sept. 23, 1919.
3 SHEETS—SHEET 2.
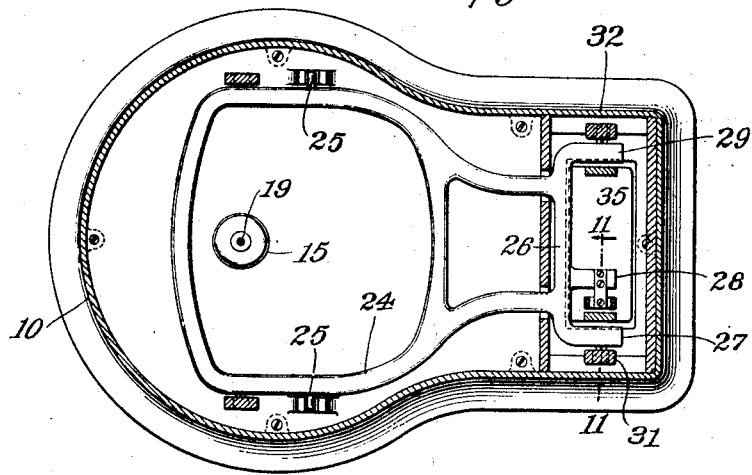
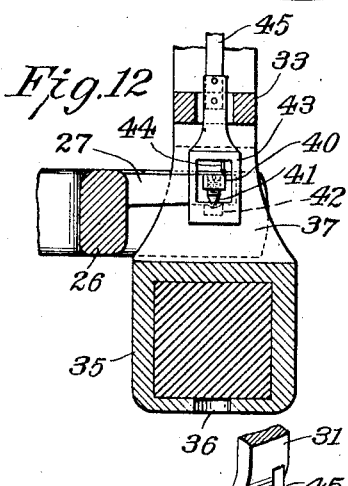
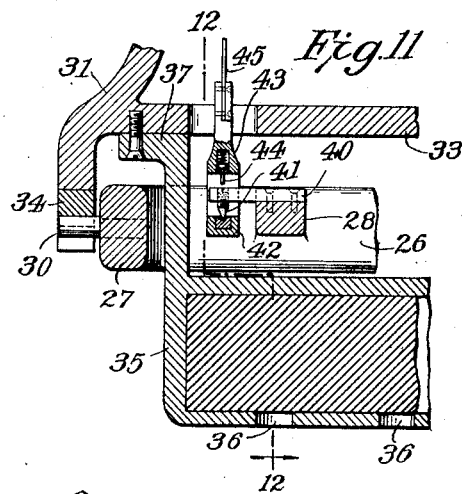
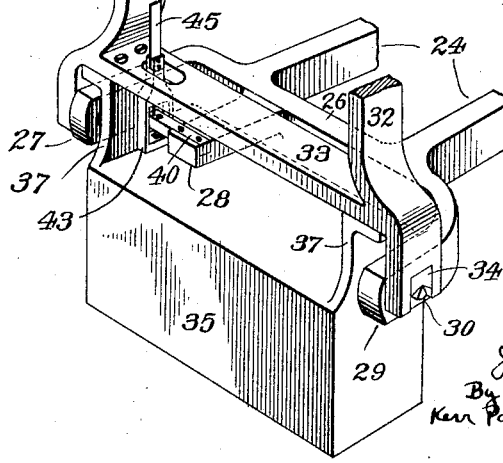

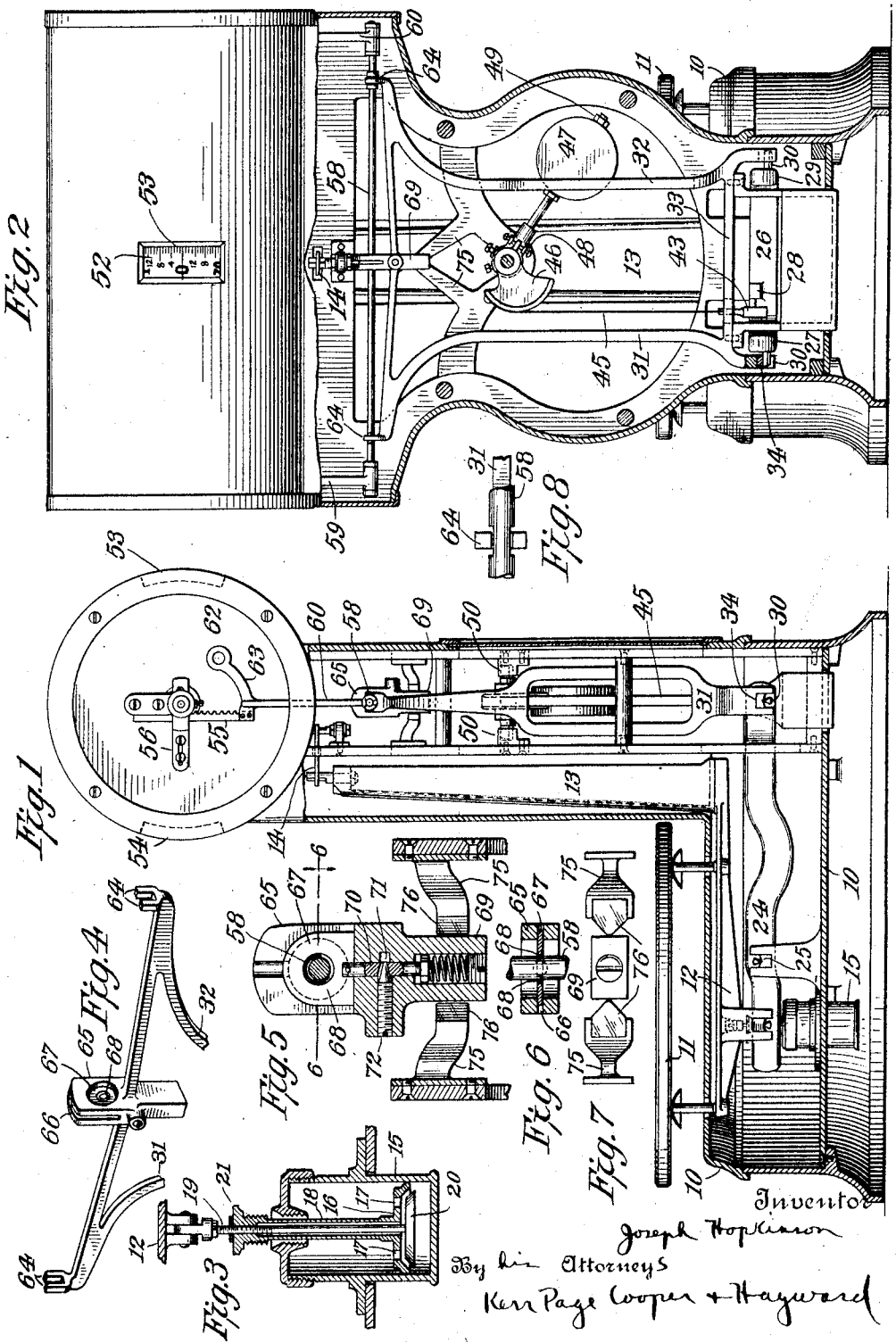

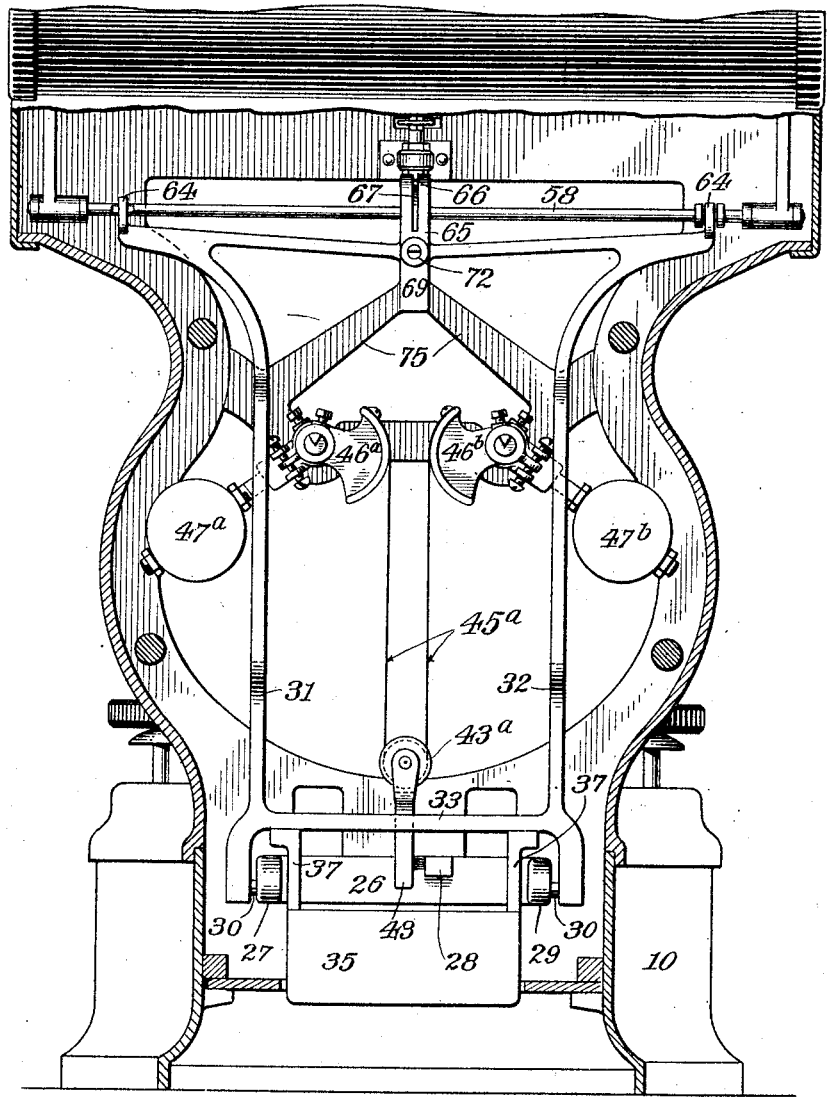

UNITED STATES PATENT OFFICE.

JOSEPH HOPKINSON, OF DAYTON, OHIO, ASSIGNOR TO THE COMPUTING SCALE COMPANY, OF DAYTON, OHIO, A CORPORATION OF OHIO.

PENDULUM-SCALE.

1,316,576.　　　　Specification of Letters Patent.　　Patented Sept. 23, 1919.

Application filed June 12, 1916.　Serial No. 103,147.

*To all whom it may concern:*

Be it known that I, JOSEPH HOPKINSON, a citizen of the United States, residing at Dayton, in the county of Montgomery and State of Ohio, have invented certain new and useful Improvements in Pendulum-Scales, of which the following is a full, clear, and exact description.

This invention relates to certain new and useful improvements in pendulum scales.

In previous scales of this type the pendulum stands in normal elevated position and tends to move downward and elevate the scale lever as a load is applied thereto. To maintain the pendulum in elevated position when there is no load on the scale, the lever is counterweighted. It has been the practice to make the counterweight an integral part of the scale lever. See for example the patent to Mittendorf #916,754. In practice this arrangement has been found unsatisfactory since it has been found difficult to properly and uniformly locate the counterweight on the lever. In addition the variable position of the center of gravity of the counterweight upon the change in the angular position of the scale lever introduces errors in the scale which are difficult to correct, particularly if the location of the center of gravity of the counterweight varies with different levers.

One object of my invention is to improve the counterweighting of the main lever by suspending the counterweight from the lever upon knife edge pivots. This construction causes the center of gravity of the counterweight to remain vertically below the knife pivots and obviates the difficulties heretofore present.

This construction also gives certain additional advantages when combined with other elements to be hereafter explained as will be more fully pointed out in the accompanying specification, shown in the drawings and set forth in the appended claims.

In the drawings Figure 1 is a side elevation of my improved scale with the case broken away to show the construction.

Fig. 2 is a rear elevation of the scale with the case and the rear brackets removed to show the construction.

Fig. 3 is a detail sectional view of the dash pot.

Fig. 4 is a perspective detail view of the frame which connects with the evener bar.

Fig. 5 is a detail central sectional view of the zero adjustment which forms a part inclosed in the upper part of the frame shown in Fig. 4.

Fig. 6 is a sectional view of Fig. 5 taken on line 6—6 and looking in the direction of the arrows.

Fig. 7 is a bottom view of Fig. 5 showing the agate guides for the frame.

Fig. 8 is a detail showing the coöperation of the forked portions of the frame with the evener bar.

Fig. 9 is a plan view of the base and the main lever.

Fig. 10 is a perspective view of the rear end of the main lever showing the counterbalancing weight on knife pivots thereon and the connections between the lever and the flexible tape and the counterweight and frame.

Fig. 11 is an enlarged detail sectional view of part of the construction shown in Fig. 10, the section being taken on line 11—11 of Fig. 9.

Fig. 12 is a sectional view taken on line 12—12 of Fig. 11.

Fig. 13 is a rear elevation similar to Fig. 2 and showing a modification in which two pendulums are employed.

In more detail in the drawings 10 is the base of the scale and 11 the platform suitably supported on a platform support 12. The platform support has an upwardly extending post 13 which coöperates with the usual overhead check 14 and thereby maintains the platform in horizontal position.

Below the platform is a dash pot 15. The dash pot comprises a plunger 16 closely fitting the walls of the dash pot tube which plunger is perforated with a number of holes 17. The plunger 16 has a stem 18 which extends through the top of the tube and which is internally bored to receive a stem 19 carrying at its lower end a valve 20. By screwing stem 19 up or down in stem 18 the valve 20 can be brought closer or farther away from its seat in plunger 16 thereby regulating the amount of liquid which can flow through the holes 17 and providing a dash pot adjustment.

In shipping the scale, a cap screw 21 can be screwed down in the orifice of the cap of the dash pot tube to prevent the escape of liquid from the dash pot. The upper end of stem 19 is pivotally connected to the platform support 12, as shown in Fig. 3. The function of the dash pot is to dampen the vibrations and to make the scale come quickly to rest after a weighing operation.

The platform support is provided with the usual feet which carry V agate bearings which rest upon upwardly pointing knife edge bearings which extend outwardly from and are carried by the looped shaped main lever 24. The lever 24 is of the first order of leverage having downwardly pointing knife edge bearings 25 which rest in the usual agate bearings carried by pedestals extending upward from the base. From the fulcrum bearings the lever 24 extends rearwardly and is provided near its end with a cross member 26. From this cross member are three extensions 27, 28, 29, see Fig. 9.

The intermediate extension 28 carries a nose iron and will be hereafter described and the outer extensions 27—29 carry outwardly extending, upwardly pointing knife edges 30.

These knife edge bearings form a support for a frame which consists in part of bifurcated side members 31 and 32 and a cross bar 33. The lower ends of the side members of this fame carry agate bearings 34 which rest upon the previously mentioned knife edges 30. The upper end of the frame is connected to the racks which operate the drum as will be hereafter described in detail.

*Counterweight.*

The counterweight for the main scale lever in its preferred embodiment is shown in detail in Figs. 10, 11 and 12 inclusive, and consists of a substantially rectangular box 35 filled with lead or any other heavy metal through the filling holes 36 in the bottom thereof. After the box is filled, if it is desired to vary the weight of the counterbalance, a portion of the metal filling may be drilled out through these holes. In this way a conterbalance of exactly the right weight may be easily manufactured. Upwardly extending from the box 35 are lugs 37 which are connected by screws to the cross member 33 of the frame, as best shown in Figs. 10 and 11.

By mounting the counterweight in the above manner the frame is in effect pivoted upon lever 24. It is always maintained exactly vertical as the preponderance of weight is below the pivot. This results in numerous advantages. It makes the line of action vertical and obviates excessive friction at the guides. In fact the use of guides for the frame is practically unnecessary since the frame in effect floats between guides.

The center of gravity of the counterweight is at all times directly below the knife pivots and this obviates the so called "pendulum action" of the counterweight which is present in scales of the Mittendorf type where the counterbalance is an integral part of the main lever.

*Pendulum and operating connections therefor.*

The intermediate extension 28 from the main lever carries a nose iron 40. The nose iron carries a conical point bearing 41 which rests in a cupped agate bearing 42 carried by a stirrup 43. The conical bearing is prevented from jumping out of the agate bearing 42 by a spring plunger 44 which is normally out of contact with the top of the nose iron to obviate friction. The spring plunger permits the stirrup 43 to be readily disengaged from the nose iron but prevents the point 4 from jumping out of its bearing when the scale is jarred.

A flexible tape 45 is fastened to the stirrup and extending upwardly and is wrapped around and connected to a compensated cam 46. This cam carries a pendulum 47 which is angularly adjustable with respect to the cam by means of the set scews 48. The pendulum also can be adjusted on its rod by means of the screws 49.

The pendulum and compensating cam are supported on knife edge bearings 50 which rest in agate bearings carried in brackets extending from the frame as shown in dotted lines in Fig. 1.

By reference to Fig. 2 it will be seen that the pendulum is in elevated position when there is no load on the scale. The pendulum is elevated to this position by reason of the weight of the frame and the counterbalance 35. When a load is applied to the scale platform the frame is elevated by the knife edges and the nose iron is elevated. The tension on the flexible tape is slackened and the pendulum descends to an extent proportional to the load on the scale platform. In this way the pendulum controls the extent of elevation of the frame.

In the embodiment shown in Fig. 13, I have shown two pendulums. The lever, frame and counterbalance arrangement is the same. Extension 28 is moved somewhat to the right and carries a nose iron which connects with the stirrup 43 in the manner previously described. The stirrup carries at its upper end a revoluble roller 43ª under which a tape 45ª is looped. The ends of the tape extend upward from the roller and connect to the two compensating cams 46ª and 46ᵇ. There are two pendulums 47ª and 47ᵇ and the other parts are duplicated as will be readily understood from the drawings.

*Operating connections to the weighing drum.*

Within the drum housing at the top of the machine is journaled a drum 52 suitably graduated with weight and price graduations. The weight is indicated through a window 53 in the back of the drum housing and the weight and price graduations are visible through a corresponding window 54 in the front of the housing as is customary in drum computing scales.

The drum is provided with the usual pinions at each end which coöperate with racks 55. The racks are prevented from enmeshing with their respective pinions by setting the adjusting blocks 56. The racks are connected with upright bars 59 and 60 which extend downward and are secured to the equalizing bar 58. Suitable weights 62 on arms 63 projecting from the rack bars maintain the racks in engagement with their respective pinions.

The equalizer bar 58 extends across under the drum and is notched or flattened as shown in Fig. 8 to receive upright lugs 64 which project upwardly from the frame heretofore described. The lugs 64 loosely fit the notched portions of the equalizer bar as clearly shown in Figs. 4 and 8. Extending upward from the central portion of the frame is an extension 65, see Figs. 4 and 13, which is horizontally bored to permit the passage of the equalizer bar therethrough. This extension is also vertically slotted at 66 to receive a plate 67. This plate is centrally bored to receive the equalizer bar and the edges of the aperture in the plate are in the form of sharp edges as shown at 68, in Figs. 5 and 6. These sharp edges fit the round equalizer rod somewhat loosely as shown in Fig. 6 thereby minimizing any friction which might take place at this point and permitting the equalizer rod to rock without friction.

The extension 65 also extends below the frame cross bar and terminates in a rectangular block 69. This portion of the frame is bored out to receive a plunger 70 which is normally pressed upwardly by the spring shown in Fig. 5. The upper end of plunger 70 is pinned to plate 67 and this plunger is also provided with a horizontally extending tapered hole 71. A screw 72 with a conically pointed end is adapted to project into the tapered hole in plunger 70. By screwing this screw in and out, plate 67 may be raised or lowered thereby providing a zero adjustment for the scale drum.

The rectangular block 69 serves to guide the frame in its vertical movements. For this purpose brackets 75 are provided which extend from the frame and carry agate bearing blocks 76 which are normally slightly spaced from block 69.

As previously explained the frame generally maintains a vertical position. The agate bearings 76 usually do not touch the block 69 at all but should shocks or rough handling temporarily displace the frame from the vertical position the bearing will guide the frame in its vertical movement with a minimum of friction.

By reason of the counterbalanced construction of the vertical frame and by reason of the coöperation of the frame and equalizer bar, side thrusts on the racks 55 are eliminated to a large extent and the action of the parts is improved by the elimination of friction which always tends to cause a drag in the movement of the weight indicating devices.

It is to be understood that my invention is not limited to the precise construction shown and described. Many modifications will occur to those skilled in the art and what I claim as my invention will be particularly pointed out in the appended claims.

I claim:—

1. In a scale, in combination; a scale lever of the first order of leverage; a platform pivotally supported thereon; pendulum means operatively connected with said lever and having a normally elevated position, and thereby tending to move downward and elevate said lever as a load is applied to the scale platform; and a counterbalancing weight pivotally connected with the scale lever and having a preponderance of weight below the pivot, whereby as the scale lever is elevated, by the application of weight to the platform, the counterbalance swings on its pivot and maintains its center of gravity vertically below its pivot, said counterbalance by its weight overbalancing the scale lever, elevating the platform and maintaining the pendulum means in normally elevated position, and resisting the tendency of the pendulum to move the aforesaid scale lever.

2. In a scale, in combination, with the weight indicating devices; a scale lever of the first order of leverage; said lever having its arms so disposed as to be substantially free from pendulum action in varying positions thereof; a counterbalance weight pivotally supported on one end of the scale lever and adapted to overbalance the end of the lever; a frame pivotally supported on the scale lever and having operating connections to the weight indicating devices; and pendulum means operatively connected to a moving part of the scale and maintained in normal elevated position by the counterbalance when there is no load upon the scale, said pendulum means being adapted to proportionally descend upon the application of a load to the scale lever, whereby the indicating devices move proportionally to the load.

3. In a scale, in combination; a scale lever of the first order of leverage; a vertical frame having operating connections to the weight indicating devices; a counterbalance associated with the vertical frame, said frame and counterbalance being pivotally mounted upon one end of the aforesaid scale lever, said counterbalance and frame together having a preponderance of weight below the pivot mounting thereof, and pendulum means operatively connected with the scale lever, and adapted to be maintained in normally elevated position by the weight of the frame and the counterbalance, said pendulum means being adapted to proportionally descend upon the application of a load to the scale lever, whereby the indicating devices are moved proportionally to the load.

4. In a scale, in combination; a scale lever of the first order; an indicating drum; a vertical frame having a plurality of operating connections at its upper end and extending to and coöperating with each end of the indicating drum; a counterbalance weight associated with the lower end of the frame; a pivot connection intermediate the scale lever and the frame, and pendulum means for controlling the movement of the drum, said pendulum means having an operative connection with the scale lever and being adapted to be maintained in normally elevated position by the counterbalance and to proportionally descend upon the application of a load to the scale lever.

5. In a scale, in combination; a scale lever of the first order of leverage; an indicating drum; a vertical frame pivoted on one end of the scale lever, having operating connections at its upper end to said drum; a counterbalance weight associated with the lower end of the frame, and adapted by its location below the pivotal connection between the frame and the scale lever to maintain the frame in a vertical position, and pendulum means operatively connected with the scale lever and adapted to be maintained in normally elevated position by the counterbalancing weight and to proportionally descend as the scale lever is loaded, whereby the drum indicates the weight on said lever, said counterbalance having a preponderance of weight below the pivot mounting.

6. In a scale, in combination; a main scale lever of the first order of leverage and having a forked end with upwardly pointed knife edges thereon; a vertical frame having bearings resting upon said knife edges; an indicating drum; racks for operating said drum; an equalizer bar connecting the racks and operatively connected with the frame; an adjustment device for varying the relative positions of the frame and the equalizer bar; a counterweight associated with the frame and located below the knife edges on the scale lever and adapted by its position to maintain the frame vertical, and pendulum means having an operative connection with a moving part of the scale for controlling the movement of the drum under the influence of a load applied to the scale lever, said pendulum being maintained in normally elevated position and proportionally descending as a load is applied to the scale lever.

7. In a scale, in combination; a scale lever; a frame pivotally mounted thereon; an indicating drum; racks for operating the drum; an equalizer bar connecting the racks; an apertured plate carried by the said frame and loosely engaging the said equalizer bar; means for varying the relative vertical position of said plate and frame whereby the equalizer bar may be raised and lowered and an adjustment of the indication on the drum secured; a pair of agate guides to guide the frame vertically; a counterweight associated with the lower end of the frame and located below the pivotal connection between the frame and the scale lever, whereby the said frame is maintained in a vertical position and floats freely between the beforementioned guides.

8. In a scale, in combination; a scale lever of the first order of leverage, pendulum means connected therewith; a frame pivotally mounted thereon; a pair of agate bearings to guide the frame in its vertical movement; a counterbalancing weight associated with the frame and disposed below the aforesaid pivotal connection of frame and lever, said counterweight being adapted to maintain the frame vertical and in position to float freely between the aforesaid bearings and being also adapted by its weight to overbalance one end of the scale lever and maintain the pendulum means in normally elevated position.

9. In a scale in combination, with a scale lever and indicating drum, driving devices on the drum, a frame pivoted on the scale lever and adapted to operate the driving devices, a counterweight adapted to maintain the frame in substantially vertical position and prevent binding between the driving devices on the drum and the operating devices associated with the frame, and guides adapted to guide the frame.

10. In a scale, in combination with a scale lever having a bifurcated rear end, knife edges on said bifurcated portions of the lever, a frame having spaced apart side members resting on said knife edges, a drum, operating connections from the frame to the drum, a pendulum and a counterbalance associated with the lever to maintain the pendulum in normal elevated position.

In testimony whereof I affix my signature in the presence of two subscribing witnesses.

JOSEPH HOPKINSON.

Witnesses:
GERTRUDE LEONARD,
HELEN HOLBERT.

Copies of this patent may be obtained for five cents each, by addressing the "Commissioner of Patents, Washington, D. C."